United States Patent
Gamache et al.

(10) Patent No.: US 6,432,215 B1
(45) Date of Patent: Aug. 13, 2002

(54) FULLY AUTOMATIC PLATING WAX REMOVING DEVICE AND METHOD THEREOF

(75) Inventors: Roger A. Gamache, Île des Soeurs; Claude Perreault, Nantes, both of (CA)

(73) Assignee: Mag-Chem Inc., Quebec (CA)

( * ) Notice: Subject to any disclaimer, the term of this patent is extended or adjusted under 35 U.S.C. 154(b) by 0 days.

(21) Appl. No.: 09/438,434

(22) Filed: Nov. 12, 1999

(30) Foreign Application Priority Data

Nov. 12, 1998 (CA) .............................. 2251208

(51) Int. Cl.⁷ ................................................. B08B 3/10
(52) U.S. Cl. ............................ 134/10; 134/18; 134/40; 134/113; 134/201
(58) Field of Search .............................. 134/10, 18, 40, 134/104.4, 109, 110, 5, 25.4, 113, 201

(56) References Cited

U.S. PATENT DOCUMENTS

| | | | |
|---|---|---|---|
| 3,061,898 A | * | 11/1962 | Maliszewski |
| 3,190,944 A | * | 6/1965 | Moore |
| 3,493,037 A | * | 2/1970 | Haake |
| 3,857,983 A | * | 12/1974 | Roth |
| 4,405,854 A | * | 9/1983 | Lapointe |
| 5,122,280 A | * | 6/1992 | Russell et al. ............... 210/745 |
| 5,203,927 A | * | 4/1993 | Yoshida et al. ............... 134/21 |
| 5,209,785 A | | 5/1993 | Brewe et al. |
| 5,518,610 A | * | 5/1996 | Pierpoline .................... 210/104 |
| 5,594,449 A | | 1/1997 | Otto ............................ 342/124 |
| 5,614,911 A | | 3/1997 | Otto et al. ................... 342/124 |
| 5,653,817 A | | 8/1997 | Schunke et al. |
| 5,656,173 A | * | 8/1997 | Jordan et al. ................ 210/703 |
| 5,659,321 A | | 8/1997 | Burger et al. ................ 342/124 |
| 5,689,265 A | | 11/1997 | Otto et al. ................... 342/124 |
| 5,727,933 A | * | 3/1998 | Laskaris et al. ............... 418/2 |
| 5,817,987 A | * | 10/1998 | Itou |

FOREIGN PATENT DOCUMENTS

| | | |
|---|---|---|
| DE | 36 38 103 C1 | 2/1988 |
| EP | 0 462 856 A2 | 12/1991 |
| JP | 11-323391 * | 11/1999 |

* cited by examiner

*Primary Examiner*—Frankie L. Stinson
(74) *Attorney, Agent, or Firm*—Merchant & Gould P.C.

(57) ABSTRACT

An improved method for removing and collecting plating wax from waxed components such as turbine engines components from aircraft, and an improved collector for reducing this method to practice. Collectors known in the art generally have 1) a process tank filled with a remover solution into which the waxed component is fully immersed and the wax is removed; 2) a wax separator tank connected to the process tank for receiving therefrom an overflow of remover solution and removed wax; and 3) a circulating pump for pumping the wax remover solution from the wax separator tank back to the process tank. The collector of the invention further has a level controller operating with microwaves for monitoring the level of remover solution in the wax separator tank and a chemical pump connected to and controlled by the level controller in order to maintain the level of wax remover solution in the wax separator tank close to a preset level by pumping a new batch of remover solution in the wax separator tank. Accordingly, unlike known collectors, the collector of the invention is fully automatic.

11 Claims, 3 Drawing Sheets

FULLY AUTOMATIC PLATING WAX REMOVING DEVICE AND METHOD THEREOF

BACKGROUND OF THE INVENTION a) Field of the Invention

The present invention relates to an improved method for removing and collecting plating wax removed from waxed components and to an improved device for reducing said method to practice. Examples of such components are turbine engines components from aircraft, which are partially coated with wax before being plated with a specific metal to ensure that only non-coated areas be plated.

b) Brief Description of the Prior Art

The traditional method for removing the wax from these components comprises the steps of immersing fully the waxed component for 5 to 20 min. in a mechanically heated wax remover solution such as D-SOLV WAX DES-OLVER™ (commercialized by Mag-Chem Inc.). After that period, the components are put in a mechanically agitated hot water (60–100° C.) for 1 to 5 min. The major drawbacks with such a method are that it is expensive and not environmentally friendly. Enormous amount of expensive wax remover solutions are necessary since the remover became rapidly saturated with wax and must then be discarded. It is also impossible to recover the wax removed from the component.

To solve the problem, the Applicant (Mag-Chem Inc.) has developed a technologically advanced method for collecting in one simple step over 95% of plating wax before the component reaches the costly dissolving bath stage. This method comprises the steps of:

a) immersing the waxed component in a bath of heated liquid masking wax;

b) bathing the waxed masked component in an automatic wax collecting equipment (commercialized by Mag-Chem Inc. under the brand name AWC SYSTEM™) filled with a heated wax remover (85–95° C.) such as KEMSOL 606™;

c) fully immersing the component for 5 to 20 min. into a mechanically heated wax remover solution such as D-SOLV WAX DESOLVER™ (commercialized by Mag-Chem Inc.); and d) immersing the component into mechanically agitated hot water (60–100° C.) for 1 to 5 min.

According to factors such as the type and size of the component and the quantity of wax coating it, it may be necessary to perform the supplementary step of:

e) immersing the component in a 10% solution of a wax remover solution such as SOLUWAX™ heated at 71–77° C. for 10 to 15 min.

The last step of the method consists of:

f) immersing the component in hot water (60–100° C.) for a final rinse.

This method has many advantages. The hot wax immersion step a) removes most of the plating wax and leaves a thin uniform film of wax on the component. In step b) up to 95% of the remaining wax is collected. This method is thus economical and environmentally superior since 1) it increases the wax remover solutions lifetime and 2) the collected wax may be re-used or sold.

As stated above, this advanced method uses an automatic wax collecting equipment named AWC SYSTEM™. The method carried out within this equipment comprises the steps of:

a) fully immersing the waxed component in a process tank filled with a heated wax remover solution and whereby the wax is removed from the component and floats on top of the remover solution;

b) letting the wax remover solution and wax floating on top of it overflow into a wax separator tank that is operatively connected to the process tank to a predetermined first level;

c) letting the floating wax decant within the wax separator tank on top of the wax remover solution and overflow when it has piled up at a predetermined second level lower that the first level;

d) pumping the wax remover solution from the wax separator tank back to the process tank with a circulating pump so as to maintain within the process tank a level of wax remover solution sufficient to allow step b) to be carried out;

e) recovering into a container the decanted wax having overflowed from the wax separator tank.

Although very effective, this method is not fully automatic. The wax remover is volatile at the high temperature used (85–95° C.) and continuously evaporates. As a result, after a certain period of time, the wax separator tank is entirely filled with decanted wax. The process must then be temporarily stopped in order to allow maintenance personnel to manually fill the separator tank with a new batch of wax remover in order to avoid pumping of decanted wax to the process tank. This level adjustment is a loss of time and results in a loss of productivity.

To improve this method, the Applicant proposes to continuously monitor and automatically control the level of wax remover solution in the separator tank. Although it may seem simple, it is not easy to determine the level of wax remover solution which is found under the wax layer. Both remover and wax are organic compounds which are non-electrically conductive. Accordingly, usual electric level controller using electrodes cannot be used with such a collector. Furthermore, since the wax layer is floating above the wax remover solution, conventional controller using float like device may not be used either. It is further impossible to use optical device (laser-like) since the floating wax layer is not translucent.

In accordance with the present invention, the Applicant has discovered that it is possible to continuously monitor the level of wax remover solution which is present under the wax layer by using a measurement device operating with microwaves. Examples of such devices are described in U.S. Pat. Nos. 5,594,449; 5,614,911; 5,659,321 and 5,689,265; and in Canadian patent application No. 2,215,626. However, these devices have never been used in the avionic industry.

Therefore, the present invention provides an improved wax collecting method and a fully automatic device for reducing to practice this method, wherein the level of wax remover solution in the separator tank is continuously monitored and automatically maintained to a preset level thanks to a level controller operating with microwaves.

SUMMARY OF THE INVENTION

It is an object of the present invention to provide an improved collector for removing and collecting a plating wax from a waxed component, the collector comprising:

a process tank filled with a heated wax remover solution into which the waxed component is fully immersed and whereby the wax is removed from the component and floats on top of the remover solution, the wax remover solution and wax floating on top of it overflowing to a predetermined first level;

a wax separator tank adjacent and operatively connected to the process tank for receiving the overflow of remover solution and floating wax, the floating wax decanting therein and forming a decanted wax layer floating above a level of wax remover solution lower than the first level, the decanted wax layer overflowing once it has piled up to a predetermined second level lower than the first level;

a circulating pump operatively connected to the process tank and the wax separator tank for pumping the wax remover solution from the wax separator tank back to the process tank;

a level controller operating with microwaves, the level controller being operatively connected to the wax separator tank for monitoring the level of remover solution below the decanted wax layer, the level controller comparing the level of remover solution with a preset level lower than the second level;

a chemical pump operatively connected to a reservoir of supplemental wax remover solution and to the wax separator tank and/or to the process tank, the chemical pump being further operatively connected to and controlled by the level controller in order to maintain the level of wax remover solution close to the preset level; and an optional container operatively connected to the wax separator tank for recovering the decanted wax overflowing from the wax separator tank.

It is also an object of the present invention to provide a method for removing a plating wax from a waxed component, the method comprising the steps of:

a) fully immersing the waxed component in a process tank filled with a heated wax remover solution and whereby the wax is removed from the component and floats on top of the remover solution;

b) letting the wax remover solution and wax floating on top of it overflow into a wax separator tank that is operatively connected to the process tank to a predetermined first level;

c) letting the floating wax decant within the wax separator tank to form a wax layer floating on top of the wax remover solution and letting this layer overflows when it has piled up to a predetermined second level lower that the first level;

d) pumping the wax remover solution from the wax separator tank back to the process tank with a circulating pump so as to maintain within the process tank a level of wax remover solution that is sufficient to allow step b) to be carried out;

e) monitoring and controlling a level of wax remover solution that is present in the wax separator tank by using a level controller operating with microwaves, the level controller comparing the level of wax remover solution below the layer of decanted wax with a preset level lower than the second level;

f) supplying with a chemical pump a supplement amount of wax remover solution stored in a reservoir into the wax separator tank and/or the process tank, the chemical pump being operatively connected to and controlled by the level controller in order to maintain the level of wax remover solution within the wax separator tank close to said preset level; and g) optionally recovering into a container operatively connected to said wax separator tank the decanted wax overflowing from the wax separator tank.

The invention and its numerous advantages will be better understood upon reading the following non-restrictive description of a preferred embodiment of it, made with reference to the accompanying drawings.

DESCRIPTION OF A PREFERRED EMBODIMENT

Figure 1:
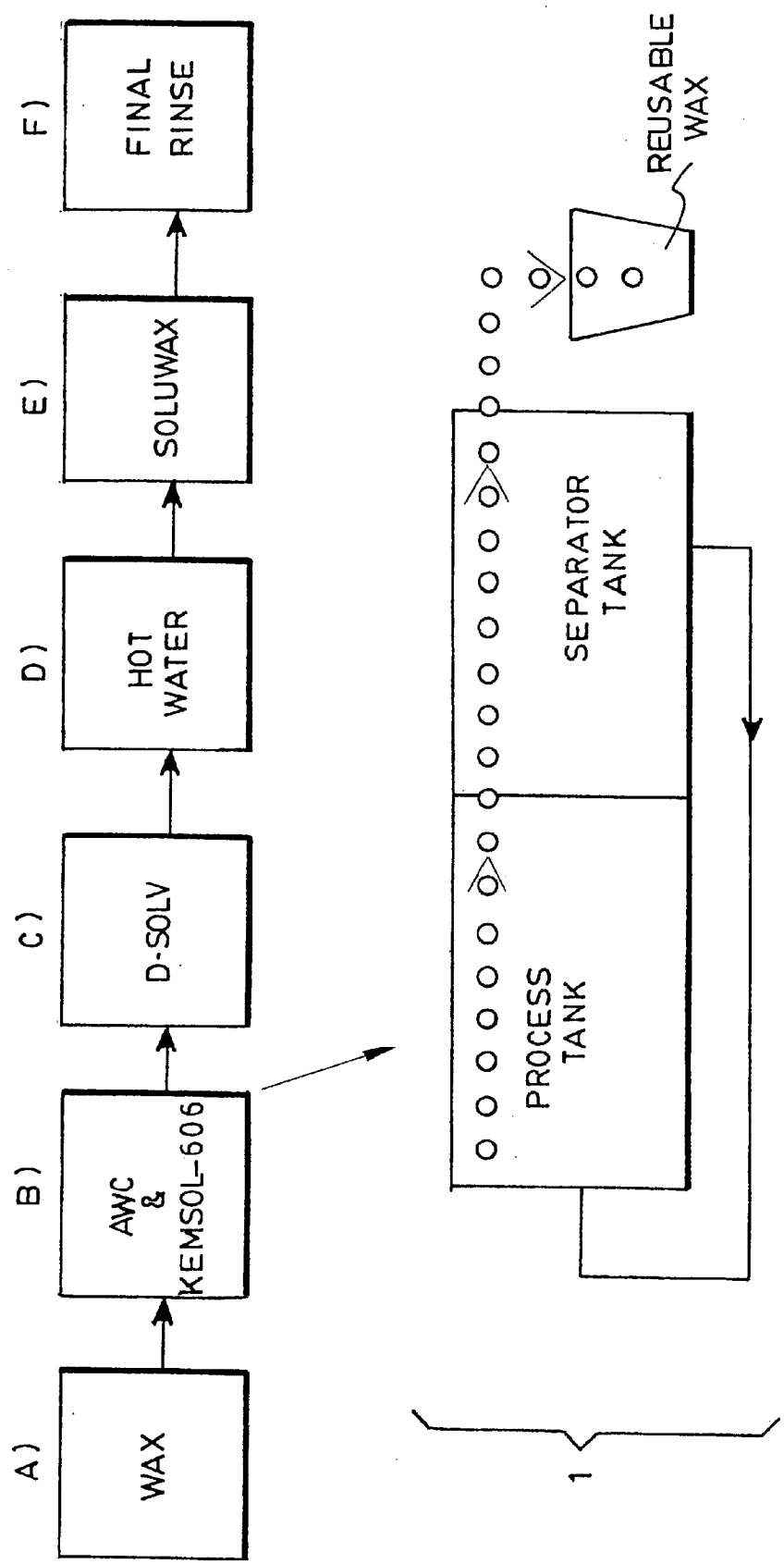
FIG. 1 is a schematic view of the known method previously developed by the Applicant for collecting plating wax from waxed components.

FIG. 1 illustrates the general method of which the method and device of the invention are part. This general method comprises six consecutive steps respectively identified by letters A) to F). In step A), the waxed component is immersed in a bath of hot liquid wax for 1 to 60 min. in order to leave on the component a thin uniform film of wax. In step B), the component is immersed in an automatic wax collector filled with a heated wax remover solution such as KEMSOL 606™ (about 5 to 20 min. at 85–95° C.) or any suitable aqueous based solution. The present invention aims to improve such a wax collector which is numbered (1) on FIG. 1 and the method used therewith. Mag-Chem Inc. presently commercializes such a wax collector under the name AWC SYSTEM™. In step C), the component is immersed in a hot emulsible oil solution such as D-SOLV™ (5 to 20 min. at 82–85° C.). In step D), the component is immersed in agitated hot water. If necessary, step E) can be carried out. Step E) consists in immersing the component in a 10% solution of SOLUWAX™ heated at 71–77° C. for 10 to 15 min. Finally, in step F), the component is immersed in hot water (60–100° C. for 1 to 5 min.) for a final rinse. Although not illustrated, the component may further be treated with a corrosion preventive product.

Figure 2B:
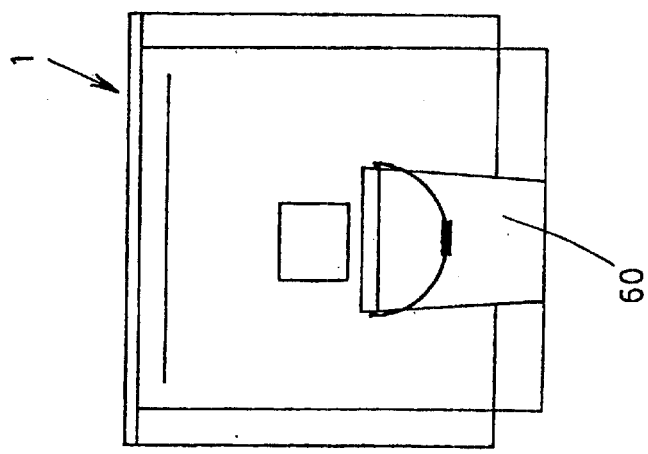
FIGS. 2 A and B respectively are cross-sectional front and side views of the automatic collecting device (AWC) identified by reference number 1 in FIG. 1.
Figure 2A:
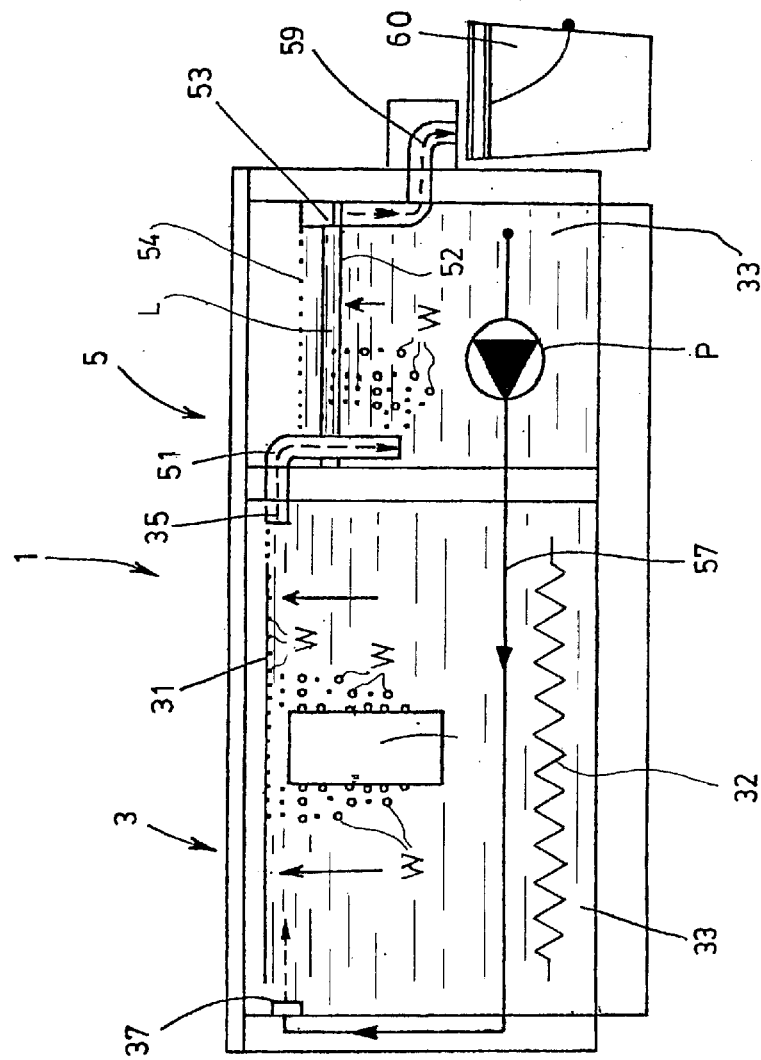

FIG. 2 shows in greater detail the wax collecting device (1) shown in FIG. 1 for collecting wax removed from a component (K). This collector (1), which as aforesaid is commercialized by Mag-Chem Inc. under the name AWC SYSTEM™, comprises a process tank (3) filled to a maximum level (31) with a heated wax remover solution (33) in which the waxed masked component (K) is fully immersed. The wax remover solution (33) is preferably kept at about 85°–95° thanks to a heating element (32) which is generally found inside the process tank (3). Such heated solution (33) helps to remove the wax from the component (K). In this solution, the removed wax (W) floats to the surface (31) of the remover (33) as indicated by an arrow. The maximum level (31) of wax remover solution (33) within the process tank (3) is predetermined since the tank (3) is provided with a trap (35) to allow a continuous overflow of wax remover solution (33) when this level (31) is reached.

This collector (1) also comprises a wax separator tank (5) adjacent and operatively connected to the process tank (3). A pipe (51) is connected to the trap (35) in order to direct (discontinuous line) the overflow of remover with floating wax towards the wax separator tank (5). Once within the wax separator tank (5), the wax is gradually decanting above said wax remover solution (33) and it piles up to form a decanted wax layer (L). The wax layer (L) accumulates within the separator tank (5) to overflow into a trap (53) once it has reached a second predetermined level (54) lower than the first level.

The collector (1) further comprises a circulating pump (P; black triangle) operatively connected by a pipe (57) to the process tank (3) and the wax separator tank (5) for pumping back the wax remover solution (55) found under the layer of wax (L) from the wax separator tank (5) to an aperture (37) found in the process tank (3). Such a pumping maintains the level of wax remover (33) to the maximum level (31). Furthermore, since the aperture (37) is proximate to the maximum level (31), the pumping creates a flow directed towards the trap (35). This flow helps in eliminating the wax floating above the wax remover solution (33).

The collector (1) preferably comprises a replaceable container (60) connected to the wax separator tank (5) by a pipe (59). The container is devised for recovering the overflow of decanted wax layer (L) from the wax separator (5). The collected wax may then be disposed off or re-used in step A) of the general method described above and illustrated in FIG. 1.

The collector (1) described herein above and shown in FIG. 2 is not fully automatic since it does not continuously monitor and automatically control the level of wax remover solution (55) in the separator tank (5).

Figure 3:
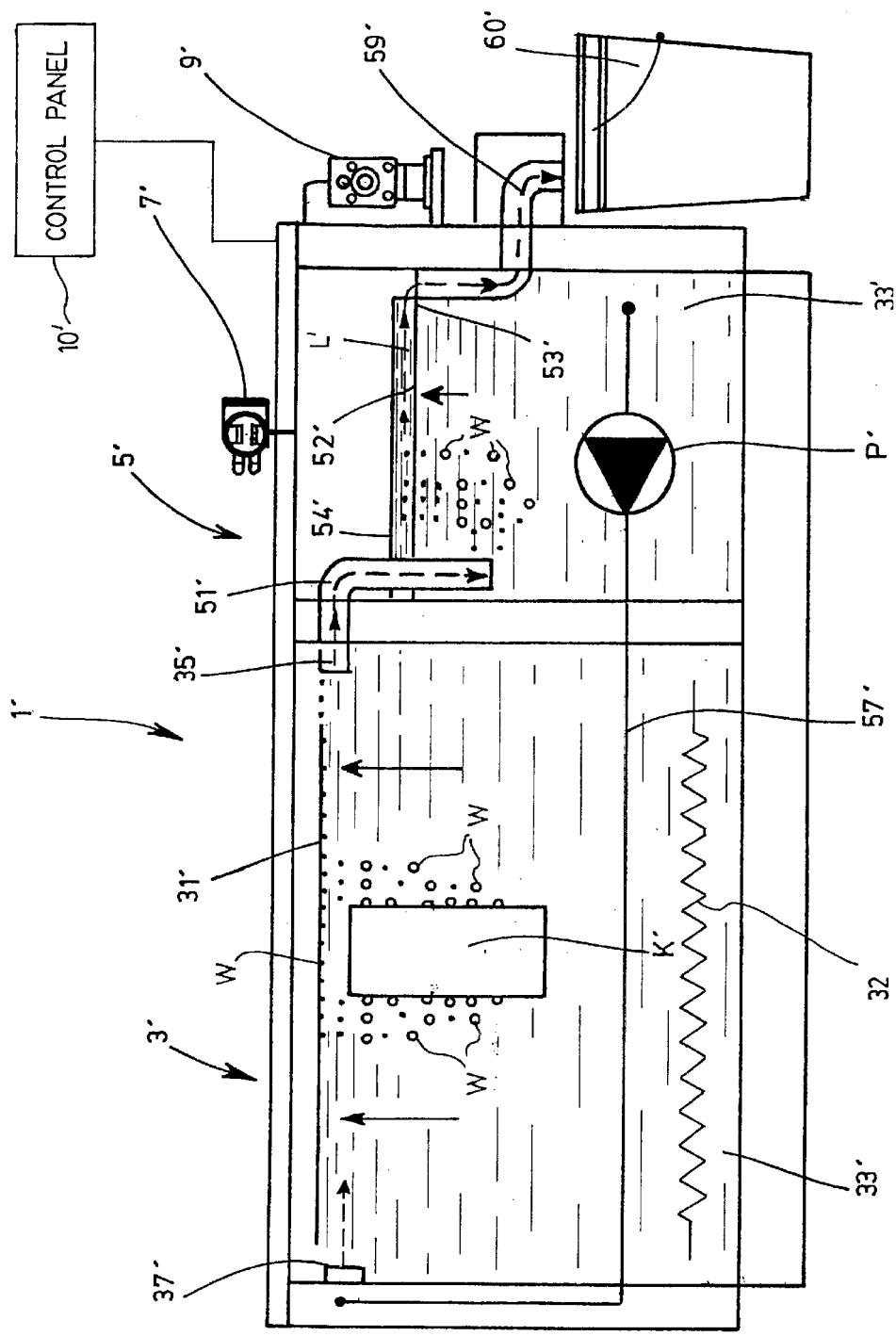
FIG. 3 is a cross-sectional front view of a preferred embodiment of a fully automatic plating wax collecting device according to the invention.

The improved collector (1') according to the invention is similar to the one shown in FIG. 2. As the device of FIG. 1, the improved collector (1') illustrated in FIG. 3, comprises a process tank (3') filled to a maximum level (31') with a heated wax remover solution (33') in which the waxed masked component (K') is fully immersed. The wax remover solution (33') is preferably kept at about 85°–95° thanks to a heating element (32') which is generally found inside the process tank (3'). The wax (W') removed from the component (K') then floats to the surface (31') of the remover (33') as indicated by an arrow. The maximum level (31') of wax remover solution (33') within the process tank (3') is predetermined since the tank (3') is provided with a trap (35') to allow overflow of wax remover (33') when said level is reached.

The improved collector (1') also comprises a wax separator tank (5') adjacent and operatively connected to the process tank (3'). A pipe (51') is connected to the trap (35') in order to direct (discontinuous line) the overflow of wax remover with floating wax towards the wax separator tank (5'). Once within the wax separator tank (5') the wax is gradually decanting above the wax remover solution and forms a decanted wax layer (L'). The wax layer (L') accumulates within the separator tank (5') to overflow into a trap (53') once it has reached a second predetermined level (54') lower than the first level (31').

The improved collector (1') further comprises a circulating pump (P'; black triangle) operatively connected by a pipe (57') to the process tank (3') and the wax separator tank (5') for pumping back the wax remover (33') found under the layer of wax (W') from the wax separator tank (5') to an aperture (37') found in the process tank (3'). Such a pumping maintains the level of wax remover (33') to the maximum level (31'). Furthermore, since the aperture (37') is proximate to the maximum level (31'), the pumping creates a flow (see the arrow close to 37') directed towards the trap (35'). This flow helps in reducing the amount of wax floating above the wax remover solution (33').

The improved collector (1') may also comprise a replaceable container (60') connected to the wax separator tank (5') by a pipe (59'). The container (60') is devised for recovering the overflow of decanted wax layer (L') from the wax separator (5'). The collected wax may then be disposed off or re-used in step A) of the general method described herein before and illustrated in FIG. 1.

In addition to all these elements which are present in the collector (1) of FIG. 2, the improved collector according to the invention (1') comprises a level controller (7') operating with microwaves. The MICROPILOT II™ commercialized by Endress & Hauser (Ville St-Laurent, Quebec, Canada) is an example of such an appropriate microwaves level controller. According to the factory owner, the MICROPILOT II™ measures the level of a content in a tank by using pulse radar. Thus, such level controller does not necessitate contact with the product to be measured since the controller measures the course time of microwaves. Interestingly, the microwaves cross easily the wax layer but bounce on the remover solution back to the controller, thereby measuring the level of the solution within the tank.

The controller (7') is operatively connected to the wax separator tank (5') for continuously monitoring within the tank (5') a level of wax remover (52') found under the floating wax layer (L'). The level controller (7') comprises a computer means for comparing the measured level with respect to a selected preset level. The preset level is preferably selected to be proximate but lower to the second level of wax (54'). The preset level must be sufficiently low to avoid any spilling of wax remover (55') in the container (60'), and at the same time, be sufficiently high in order to avoid any pumping of wax (W') by the pump (P').

The improved collector (1') according to the invention also comprises a chemical pump (9') operatively connected to a reservoir of supplemental wax remover (not illustrated), for pumping a new batch of wax remover solution from the reservoir into the wax separator tank (5'). This chemical pump (9') is also operatively connected to the microwaves level controller (7'), in order to be controlled and activated therewith. The controller (7') activates the pump (9') when it measures that the actual level of wax remover (55') is lower than the preset level and stops said pump (9') once the preset level is reached.

Obviously, instead of being connected to the wax separator tank (5'), the chemical pump (9') could be connected to the process tank (3') for pumping thereto new wax remover such that an increased overflow of wax remover from the process tank (3') to the separator tank (5') would occur, thereby increasing therein the level (52') of wax remover (55').

Furthermore, the collector (1') preferably comprises a control panel (10') for operating the collector, programming the microwaves controller (7'), manually activating or stopping the circulating pump (P'), the chemical pump (9') and/or the heating element (32').

While several embodiments of the invention have been described, it will be understood that the present invention is capable of further modifications, and this application is intended to cover any variations, uses, or adaptations of the invention, following in general the principles of the invention and including such departures from the present disclosure as to come within knowledge or customary practice in the art to which the invention pertains, and as may be applied to the essential features hereinbefore set forth and falling within the scope of the invention or the limits of the appended claims.

What is claimed is:

1. A collector for removing a plating wax from a waxed component, the collector comprising:

a process tank filled with a heated wax remover solution into which the waxed component is fully immersed and whereby the wax is removed from the component and floats on top of the remover solution, said wax remover solution and wax floating on top of it overflowing to a predetermined first level;

a wax separator tank adjacent and operatively connected to the process tank for receiving said overflow of remover solution and floating wax, the floating wax decanting therein and forming a decanted wax layer floating above a level of wax remover solution lower than said first level, the decanted wax layer overflowing once it has piled up to a predetermined second level lower than the first level;

a circulating pump operatively connected to the process tank and the wax separator tank for pumping the wax remover solution from the wax separator tank back to the process tank;

a level controller operating with microwaves, the level controller being operatively connected to the wax separator tank for monitoring the level of remover solution below the decanted wax layer, the level controller comparing the level of remover solution with a preset level lower than the second level; and a chemical pump operatively connected to a reservoir of supplemental wax remover solution and to the wax separator tank and/or to the process tank, the chemical pump being further operatively connected to and controlled by the level controller in order to maintain the level of wax remover solution close to the preset level.

2. The collector of claim 1, further comprising a heating element operatively connected to the process tank and/or the separator tank, the heating element maintaining hot the wax remover solution contained into said process tank and the separator tank.

3. The collector of claim 1, further comprising a container operatively connected to the wax separator tank for recovering the decanted wax layer overflowing from the wax separator tank.

4. The collector of claim 3, wherein the container for recovering wax is a replaceable container.

5. The collector of claim 1, wherein the level controller is a controller commercialized by Endress & Hauser under the name MICROPLOT II™.

6. The collector of claim 1, further comprising a control panel for programming the controller, manually activating or stopping the circulating pump and/or the chemical pump.

7. A method for removing a plating wax from a waxed component, said method comprising the steps of:

a) fully immersing the waxed component in a process tank filled with a heated wax remover solution and whereby the wax is removed from the component and floats on top of the remover solution;

b) letting the wax remover solution and wax floating on top of it overflow into a wax separator tank that is operatively connected to the process tank to a predetermined first level;

c) letting the floating wax decant within the wax separator tank to form a wax layer floating on top of the wax remover solution and letting this layer overflows when it has piled up to a predetermined second level lower that the first level;

d) pumping the wax remover solution from the wax separator tank back to the process tank with a circulating pump so as to maintain within the process tank a level of wax remover solution that is sufficient to allow step b) to be carried out;

e) monitoring and controlling a level of wax remover solution that is present in the wax separator tank by using a level controller operating with microwaves, said level controller comparing the level of wax remover solution below the layer of decanted wax with a preset level lower than the second level; and f) supplying with a chemical pump a supplement amount of wax remover solution stored in a reservoir into the wax separator tank and/or the process tank, said chemical pump being operatively connected to and controlled by the level controller in order to maintain the level of wax remover solution within the wax separator tank close to said preset level.

8. The method of claim 7, further comprising a step g) of recovering the decanted wax overflowing from the wax separator tank into a container operatively connected to said wax separator tank.

9. The method of claim 7, wherein the wax remover solution is KEMSOL 606™.

10. The method of claim 7, wherein the wax remover solution is heated at about 85°–95° C.

11. The method of claim 7, wherein the waxed component is immersed in the process tank for about 5 to 20 min.

* * * * *